United States Patent [19]

Mankey

[11] Patent Number: 4,596,300

[45] Date of Patent: Jun. 24, 1986

[54] VEHICULAR PROPULSION AND POSITIONING SYSTEM

[75] Inventor: Harry S. Mankey, Dallas, Tex.

[73] Assignee: Standard Manufacturing Company Inc., Dallas, Tex.

[21] Appl. No.: 602,554

[22] Filed: Apr. 20, 1984

[51] Int. Cl.[4] .............................................. B60K 27/00
[52] U.S. Cl. .......................................... 180/74; 280/3
[58] Field of Search ...................... 180/74; 280/14.1, 3; 74/206, 207; 244/50

[56] References Cited

U.S. PATENT DOCUMENTS

| 2,920,845 | 1/1960 | Palmiter | 244/50 X |
| 4,470,564 | 9/1984 | Johnson | 280/3 |

FOREIGN PATENT DOCUMENTS

| 2711214 | 1/1979 | Fed. Rep. of Germany | 180/74 |
| 1031098 | 6/1953 | France | 180/74 |

*Primary Examiner*—Harry Tanner
*Attorney, Agent, or Firm*—Michael A. O'Neil

[57] ABSTRACT

Subframes (30, 70) are supported for pivotal movement under the action of hydraulic cylinders (36, 76) to selectively engage drive rollers (42, 82) with wheels (14,16) of an aerial weapons handling trailer (10). Drive motors (48, 88) are operatively connected to the drive rollers (42, 82) to propel the aerial weapons handling trailer (10) and are further adapted to lock the drive rollers (42, 82) against rotation. The drive motors (48, 88) are mounted on housings (46, 86) supported for pivotal movement about the axes of the drive rollers (42, 82). Hydraulic cylinders (58, 98) are utilized to selectively pivot the housings (46, 86) when the drive rollers (42, 82) are engaged with the wheels (14, 16) and locked against rotation, thereby rotating the wheels (14, 16) to position the aerial weapons handling trailer (10).

17 Claims, 5 Drawing Figures

VEHICULAR PROPULSION AND POSITIONING SYSTEM

TECHNICAL FIELD

This invention relates to apparatus for effecting both the propulsion and the precise positioning of large vehicles, particularly aerial weapons handling trailers.

BACKGROUND AND SUMMARY OF THE INVENTION

The co-pending application of Norman Dean Oswald, Robert R. Dean and Harry S. Mankey filed Sept. 28, 1982, Ser. No. 426,220 entitled Aerial Weapons Handling Trailer discloses and claims a vehicle adapted to receive, transport, lift and position large weapons packages. In the operation of the apparatus therein disclosed, a weapons package is initially transported in a generally longitudinal direction. After the weapons package has been positioned adjacent an aircraft, for example, a B1 bomber, a B52 bomber, etc., the aerial weapons handling trailer is moved transversely to position the weapons package under the weapons bay of the aircraft. The trailer is thereafter operated to lift the weapons package into the weapons bay for attachment therein.

The attachment of a weapons package in the weapons bay of an aircraft requires extremely precise positioning of the weapons package relative to the attachment apparatus of the aircraft. The task of properly aligning the weapons package is complicated by the fact that the weapons package is extremely heavy, weighing up to 60,000 pounds or more. Moreover, the weapons package must be positioned by the weapons handling trailer after the lifting apparatus of the trailer is fully extended vertically to position the weapons package in the weapons bay of the aircraft.

The present invention comprises improvements in the design of the above identified aerial weapons handling trailer for facilitating both the propulsion of the trailer and the weapons package carried thereby and the final positioning of the weapons package after it has been elevated into the weapons bay of an aircraft by operation of the aerial weapons handling trailer. In accordance with the broader aspects of the invention, drive rollers are engaged with selected wheels of the aerial weapons handling trailer whenever it is desired to propel the apparatus. The drive rollers are provided with actuating motors whereby, upon engagement of the drive rollers with the wheels of the trailer and operation of the drive motors, the aerial weapons handling trailer is propelled. After the aerial weapons handling trailer is positioned beneath the weapons bay of the aircraft, the drive motors are locked and the drive rollers are retained in engagement with wheels of the trailer, thereby locking the trailer in place.

Final positioning of the weapons package in the weapons bay of the aircraft is effected by cylinders which function to pivot the entire drive roller assembly about the axis of rotation thereof. Since each drive roller is engaged with a wheel of the trailer, and since the drive motor of each roller is locked, thereby preventing rotation of each drive roller, this action forces the trailer wheel to rotate about its axis.

In this manner, the apparatus of the present invention is adapted to effect extremely precise positioning of the weapons package within the weapons bay of the aircraft.

DESCRIPTION OF THE DRAWINGS

A more complete understanding of the invention may be held by reference to the following Detailed Description when taken in conjunction with accompanying drawings, wherein.

DETAILED DESCRIPTION

Figure 1:
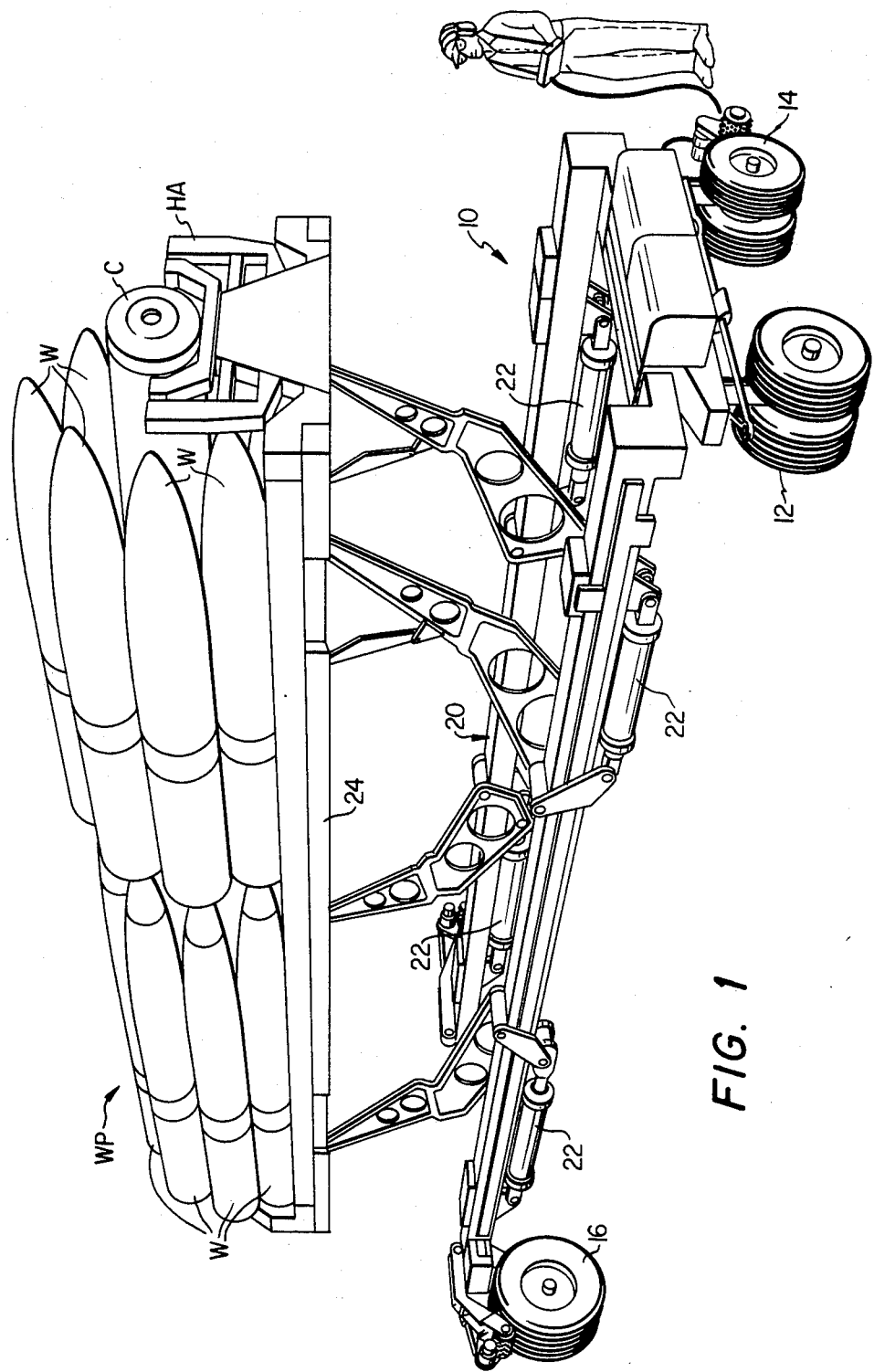
FIG. 1 is an illustration of an aerial weapons handling trailer incorporated in the present invention.

Referring now to the drawings, and in particular to FIG. 1 thereof, there is shown an aerial weapons handling trailer 10 incorporating the present invention. The aerial weapons handling trailer 10 includes two sets of front wheels 12 and 14 and two rear wheels 16 and 18 which support a generally U-shaped chassis 20. A plurality of hydraulic cylinders 22 are mounted on the chassis 20 and function to support and position a pair of spaced apart, longitudinal extending lift beams 24.

In the operation of the aerial weapons handling trailer 10, the lift beams 24 are utilized to receive, transport and lift a weapons package WP. Typically, the wheels 12, 14, 16, and 18 are initially positioned to facilitate movement of the aerial weapons handling trailer 10 in a generally longitudinal direction. The aerial weapons handling trailer 10 is thus adapted to receive and to transport the weapons package WP, and to position the weapons package WP alongside an aircraft. Thereafter, the wheels 12, 14, 16 and 18 may be positioned as illustrated in FIG. 1 to facilitate transverse movement of the aerial weapons handling trailer 10. In this manner the positioning of the aerial weapons handling trailer 10 and the weapons package WP carried thereby beneath the weapons bay of the aircraft is facilitated. After the weapons package WP is positioned beneath the weapons bay of the aircraft, the aerial weapons handling trailer 10 is utilized to lift the weapons package WP into the weapons bay and to precisely position the weapons package WP for attachment in the weapons bay of the aircraft. A more complete understanding of the construction and operation of the aerial weapons handling trailer 10 may be had by reference to co-pending application Ser. No. 426,220, filed Sept. 28, 1982, and assigned to Standard Manufacturing Company, Inc., the disclosure of which is incorporated herein by reference.

Figure 2:
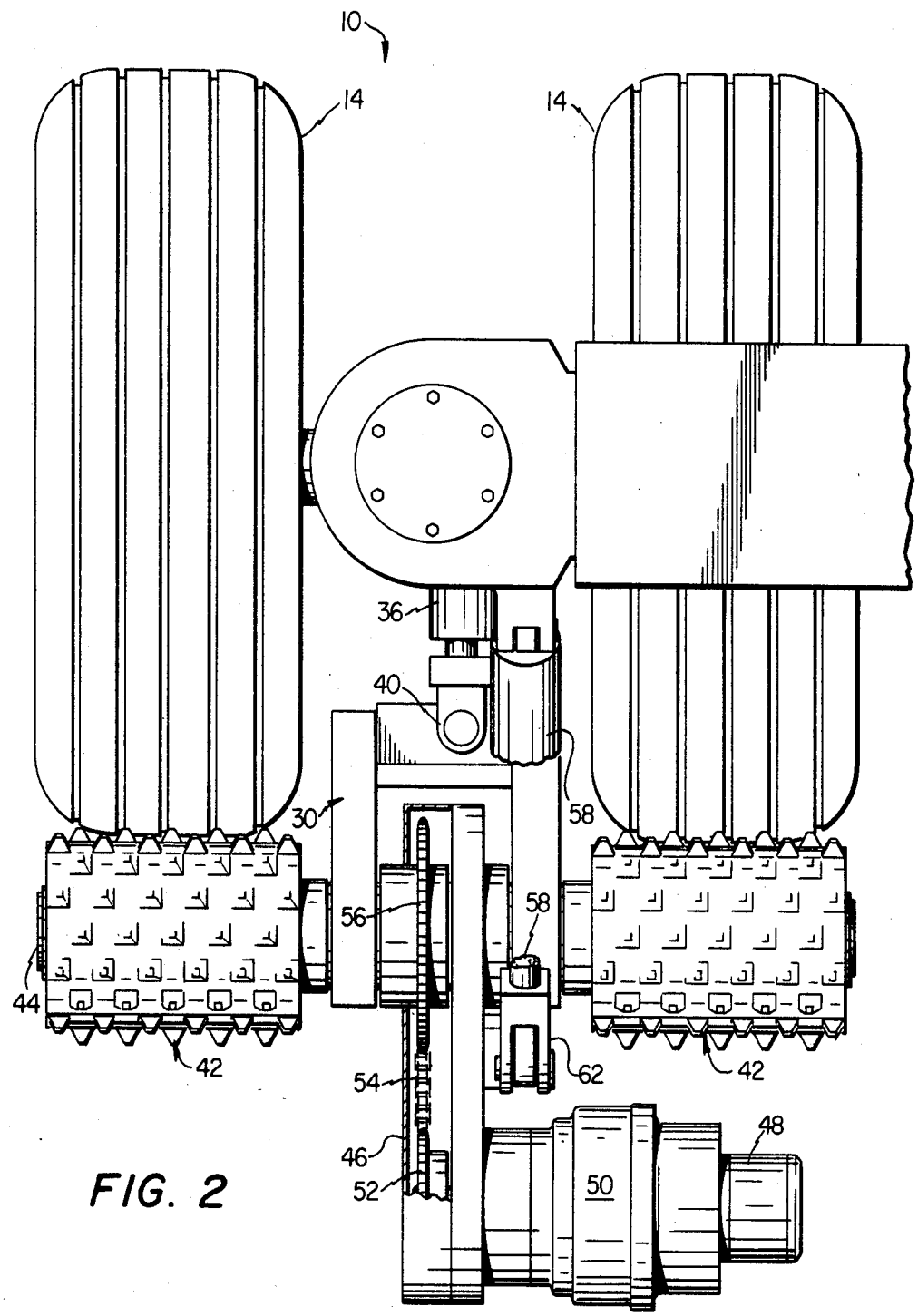
FIG. 2 is a top view of one of the sets of front wheels of the aerial weapons handling trailer of FIG. 1 showing the adaptation of the present invention thereto.
Figure 3:
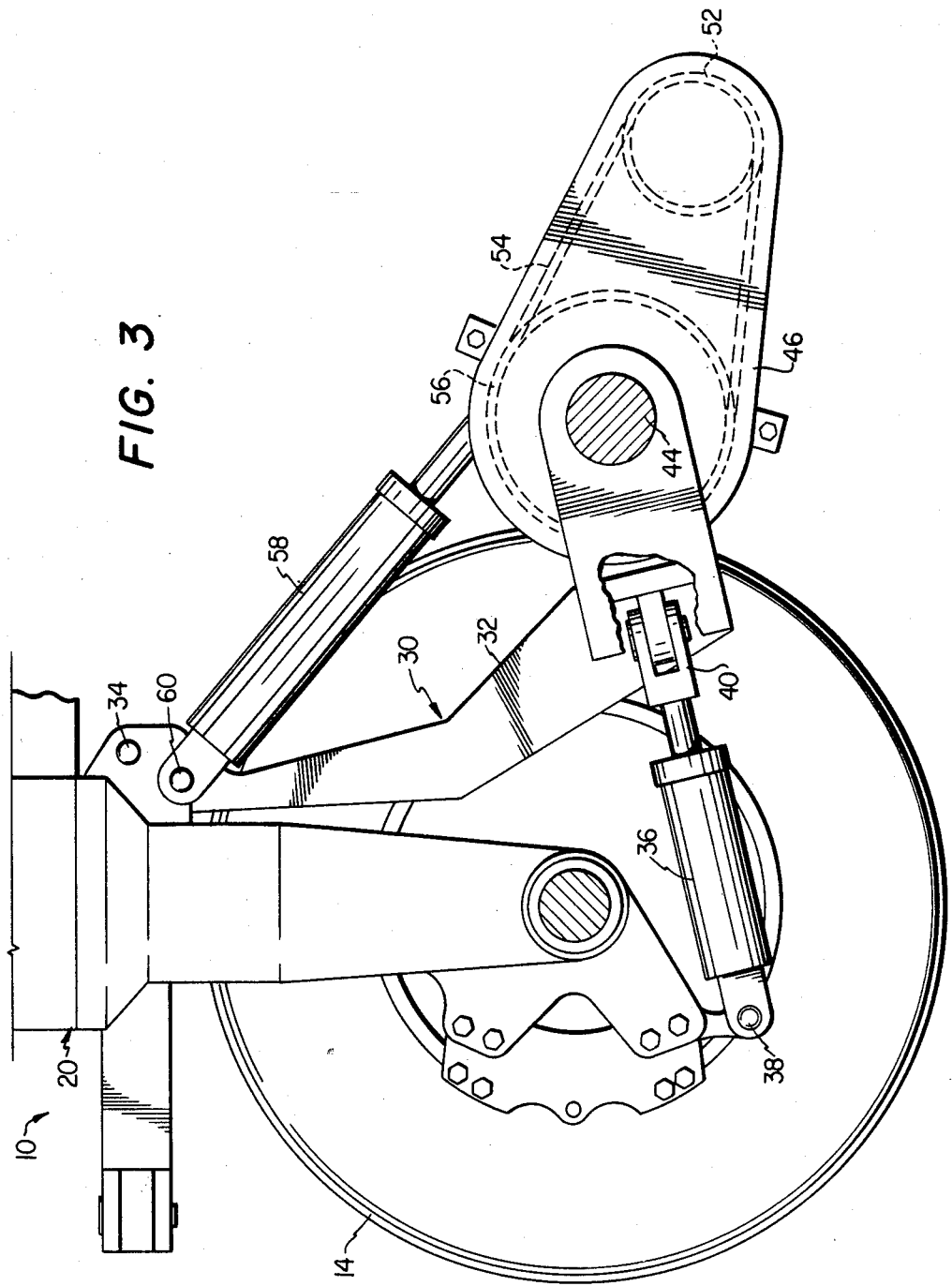
FIG. 3 is a sectional view taken generally along the line 3—3 in FIG. 2 in the direction of the arrows.

The present invention comprises apparatus for effecting both propulsion of the aerial weapons handling trailer 10 and final positioning of the weapons package WP within the weapons bay of the aircraft. Referring to FIGS. 2 and 3, the front wheels 14 of the the aerial weapons handling trailer 10 are shown. A subframe 30 includes an arm 32 which is pivotally supported on the chassis 20 of the aerial weapons handling trailer 10 by a pin 34. A hydraulic cylinder 36 is connected at one end to the chassis 20 by a pin 38 and at the other end to the subframe 30 by a clevis 40. Thus, upon actuation of the cylinder 36, the subframe 30 is adapted for pivotal movement toward and away from the front wheels 14.

A pair of drive rollers 42 are fixedly mounted on a drive shaft 44 which is in turn rotatably supported on the subframe 30. A housing 46 is pivotally supported on the drive shaft 44 and in turn supports a drive motor 48 and a speed reducer 50. The drive motor 48 drives the speed reducer 50 which in turn drives a sprocket 52. A chain 54 is entrained around the sprocket 52 and sprocket 56 secured to the drive shaft 44. Thus, upon operation of the drive motor 48, the drive rollers 42 are rotated by means of the speed reducer 50, the sprocket 52, the chain 54, the sprocket 56 and the drive shaft 44. Conversely, when the drive motor 48 is not operating the drive rollers 42 are locked against rotation through the same components.

A hydraulic cylinder 58 is connected to the chassis 20 of the aerial weapons handling trailer 10 by a pin 60, and is connected to the housing 46 by a clevis 62. Assume that the hydraulic cylinder 36 is actuated to securely engage the drive rollers 42 with the set of front wheels 14 of the aerial weapons handling trailer 10. Assume further that the drive motor 48 is actuated to lock the drive rollers 42 against rotation. Under this set of conditions, operation of the cylinder 58 forces the housing 46 and therefore the drive rollers 42 to pivot about the axis of the drive shaft 44. Since the drive rollers 42 are locked against pivotal movement relative to the housing 46, pivotal movement of the housing 46 about the axis of the drive shaft 44 effects rotation of the front wheels 14. Since the hydraulic cylinder 58 is adapted for actuation in very minute increments, and since the diameter of the drive rollers 42 is small relative to the diameter of the front wheels 14, operation of the hydraulic cylinder 58 is effective to cause very small movements of the front end of the aerial weapons handling trailer 10. In this manner the positioning of a weapons package carried by the aerial weapons handling trailer 10 is very precisely controlled.

Figure 4:
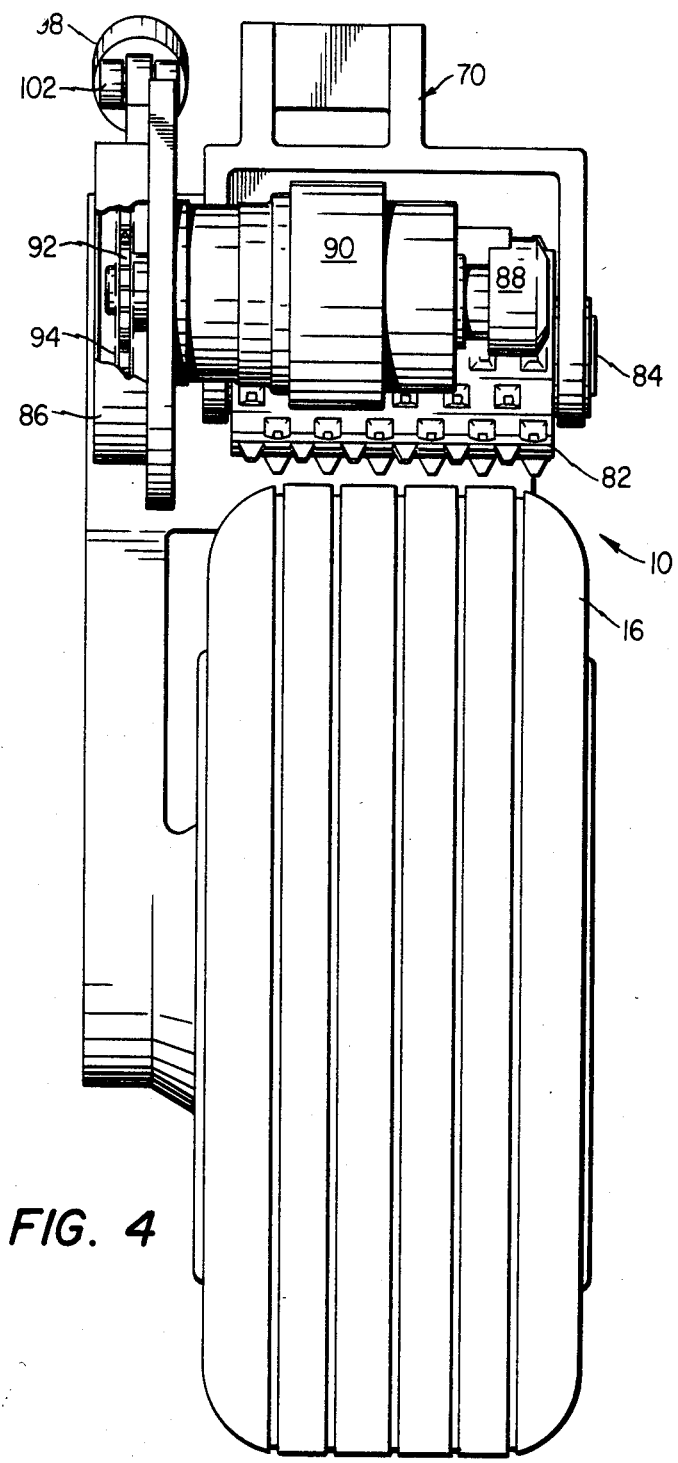
FIG. 4 is an end view of one of the rear wheels of the aerial weapons handling trailer of FIG. 1 showing the adaptation of the present invention thereto.
Figure 5:
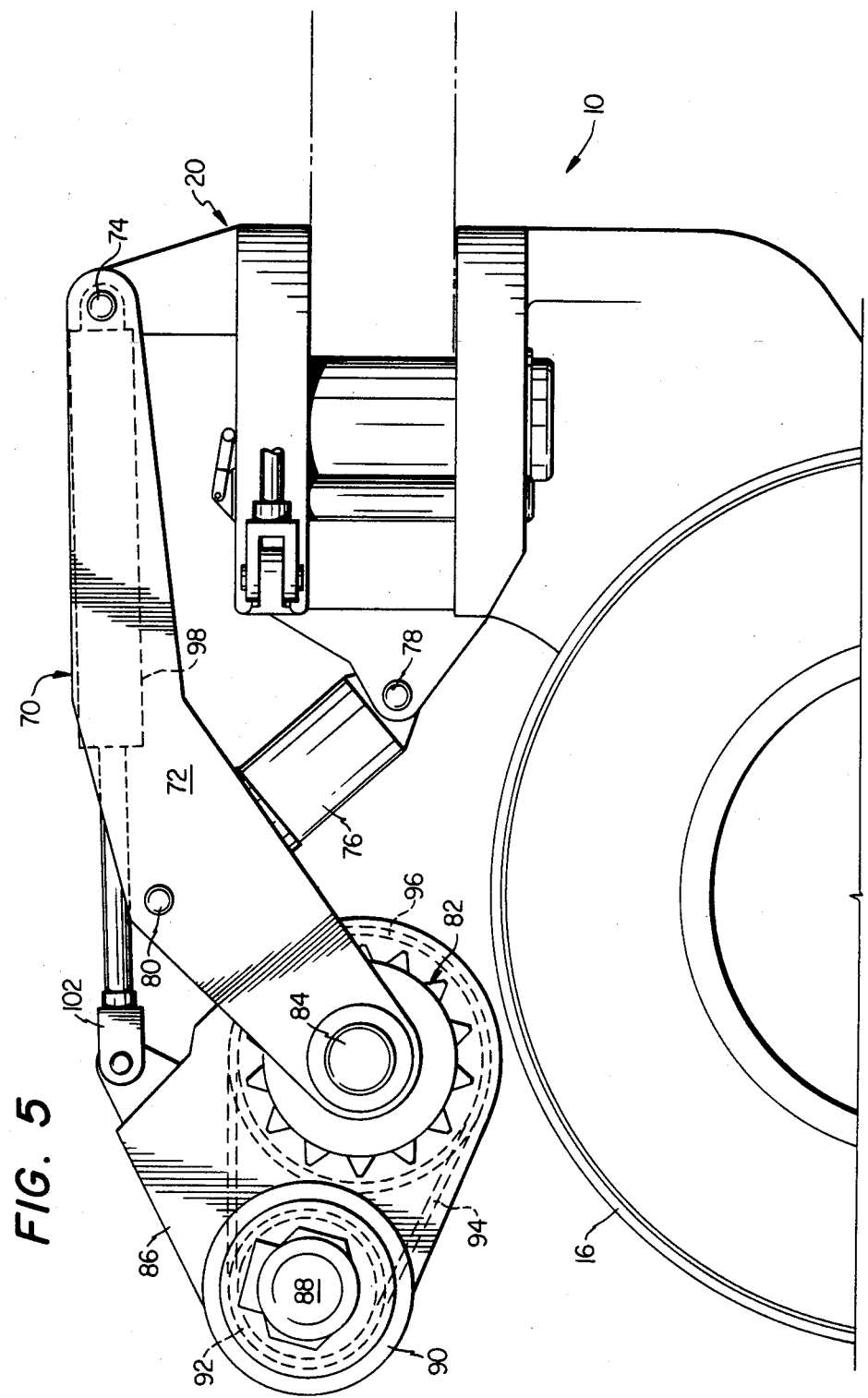
FIG. 5 is a side view of the apparatus shown in FIG. 4.

Referring now to FIGS. 4 and 5, the rear wheels 16 of the aerial weapons handling trailer 10 are shown. A subframe 70 includes an arm 72 which is pivotally connected to the chassis 20 of the aerial weapons handling trailer 10 by a pin 74. A hydraulic cylinder 76 is connected at one end to the chassis 20 of the trailer 10 by a pin 78 and at the opposite end to the arm 72 by a pin 80. Thus, upon actuation of the hydraulic cylinder 76, the subframe 70 is selectively pivoted toward and away from the wheels 16.

A drive roller 82 is secured to a drive shaft 84 which is in turn pivotally supported on the subframe 70. A housing 86 is pivotally supported on the drive shaft 84 and in turn supports a drive motor 88 and a speed reducer 90.

The speed reducer 90 has an output which drives a sprocket 92. A chain 94 is entrained around the sprocket 92 and a sprocket 96 secured to the drive shaft 84. Thus, upon actuation, the drive motor 88 functions through the speed reducer 90, the sprocket 92, the chain 94, the sprocket 96 and the drive shaft 84 to rotate the drive roller 82. Conversely, when the drive motor 88 is not operating the drive roller 82 is locked against rotation through the same components.

A hydraulic cylinder 98 is connected at one end to the chassis 20 of the weapons handling trailer 10 by means of the pin 74 and is connected at the opposite end to the housing 86 by means of a clevis 102. Assuming that the hydraulic cylinder 76 is actuated to engage the drive roller 82 with the rear wheel 16, and further assuming that the drive motor 88 is actuated to lock the drive roller 82 against rotation, actuation of the hydraulic cylinder 98 causes the housing 86 and therefore the drive roller 82 to pivot about the axis of the drive shaft 84. This causes rotation of the rear wheels 16 and thereby effects movement of the rear end of the aerial weapons handling trailer 10.

It will be understood that the hydraulic cylinder 98 is adapted for very precise actuation through very minute increments. Likewise, the diameter of the drive roller 82 is extremely large relative to the diameter of the wheels 16. These factors combine to effect very small movements of the rear end of the aerial weapons handling trailer 10 under the action of the hydraulic cylinder 98, which in turn allows very precise positioning of a weapons package carried by the trailer.

DESCRIPTION OF THE DRAWINGS

The aerial weapons handling trailer 10 is in fact a trailer and as such is normally moved from place to place by towing. Whenever circumstances require, the apparatus of the present invention may be utilized to propel the aerial weapons handling trailer 10 in lieu of a towing vehicle. One frequently occurring circumstance in which the present invention finds utility is the transverse movement of the aerial weapons handling trailer 10 and a weapons package carried thereby from a point adjacent to an aircraft to a point immediately beneath the weapons bay of the aircraft.

The apparatus of the present invention is utilized to propel the aerial weapons handling trailer 10 by first actuating the hydraulic cylinders 36 and 76 to engage the drive rollers 42 and 82 with the wheels of the aerial weapons handling trailer 10. Thereafter, the drive motors 48 and 88 are actuated to effect rotation of the drive rollers 42 and 82, thereby propelling the aerial weapons handling trailer 10. If desired, the drive motors 48 and 88 may be actuated independently, thereby moving one end of the aerial weapons handling trailer while the opposite end remains relatively stationary. The drive motors 48 and 88 may also be operated in opposite directions to effect pivotal movement of the weapons handling trailer around a relatively centrally disposed axis.

After the aerial weapons handling trailer 10 is positioned beneath the weapons bay of the aircraft the drive motors 48 and 88 are deactuated and locked. At this point the aerial weapons handling trailer 10 is utilized to lift the weapons package into the weapons bay of the aircraft. Final positioning of the weapons package relative to the aircraft may be accomplished by means of the hydraulic cylinders 58 and 98. Upon actuation, the cylinders 58 and 98 effect pivotal movement of the housings 46 and 86 about the axes of the drive shafts 44 and 84. Since the drive rollers 42 and 82 are locked in place, this action causes minute rotation of the tires of the aerial weapons handling trailer 10, thereby effecting final positioning of the weapons package WP carried by the aerial weapons handling trailer. Again, the hydraulic cylinders 58 and 98 may be operated in unison, independently, or in opposite directions depending on the nature of the positioning adjustments that are required under the circumstances.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention. In particular, it will be understood that the invention is not limited to use with aerial weapons handling trailers, but can be adapted for use with almost any type of vehicle.

I claim:

1. Apparatus for propelling and positioning a vehicle of the type having a chassis supported on wheels which comprises:
    a subframe;
    means supporting the subframe on the chassis of the vehicle for pivotal movement toward and away one of the wheels thereof;
    a drive shaft;
    means supporting the drive shaft on the subframe for rotation about a predetermined axis;
    a drive roller fixedly mounted on the drive shaft;
    means for selectively pivoting the subframe relative to the chassis of the vehicle and thereby selectively engaging and disengaging the drive roller with said one of the wheels of the vehicle;
    a housing supported on the drive shaft for pivotal movement about the axis thereof;
    a drive motor mounted on the housing;
    means operatively connecting the output of the drive motor to the drive shaft;
    said drive motor when actuated and when said drive roller is engaged with said one of the wheels of the vehicle comprising means for propelling the vehicle, and when nonactuated comprising means for locking the drive roller against rotation about the axis of the drive shaft; and
    means for selectively pivoting the housing about the axis of the drive shaft when the drive roller is engaged with said one of the wheels of the vehicle and locked against rotation and thereby selectively rotating said one of the wheels to position the vehicle.

2. The apparatus according to claim 1 wherein the means for selectively pivoting the subframe comprises a fluid powered cylinder connected between the chassis of the vehicle and the subframe.

3. The apparatus according to claim 1 wherein the means for connecting the output of the drive motor to the drive shaft comprises:
    a speed reducer driven by the output of the drive motor;
    a sprocket driven by the output of the speed reducer;
    a sprocket fixedly mounted on the drive shaft; and
    a chain entrained around the sprocket driven by the speed reducer and the sprocket on the drive shaft.

4. The apparatus according to claim 1 wherein the means for selectively pivoting the housing about the axis of the drive shaft comprises a fluid powered cylinder connected between the chassis of the vehicle and the housing.

5. The apparatus according to claim 1 wherein:
    the means for pivoting the subframe comprises a fluid powered cylinder connected between the chassis of the vehicle and the subframe;
    the means for pivoting the housing comprises a fluid powered cylinder connected between the chassis of the vehicle and the housing; and
    the drive means comprises a speed reducer driven by the drive motor and a chain and sprocket drive operatively interconnecting the speed reducer and the drive shaft.

6. Apparatus for propelling and positioning a vehicle of the type having a chassis supported by wheels which comprises:
    a subframe;
    a drive roller mounted on the subframe for rotation about a predetermined axis;
    means for selectively pivoting the subframe relative to the chassis of the vehicle and thereby selectively engaging and disengaging the drive roller with one of the wheels of the vehicle;
    a housing supported for pivotal movement about the axis of the drive roller;
    drive means mounted on the housing for actuation to propel the vehicle when the drive roller is engaged with said one of the wheels thereof;
    said drive means further comprising means for locking the drive roller against rotation about the axis thereof; and
    means for selectively pivoting the housing about the axis of the drive roller when the drive roller is engaged with said one of the wheels of the vehicle and locked against rotation and thereby selectively rotating said one of the wheels of the vehicle to position the vehicle.

7. The apparatus according to claim 6 wherein the means for selectively pivoting the subframe comprises fluid powered cylinder means.

8. The apparatus according to claim 6 wherein the drive roller is fixedly mounted on a drive shaft which is supported for rotation about the axis of the drive roller.

9. The apparatus according to claim 6 wherein the drive means includes a drive motor mounted on the housing and means operatively connecting the output of the drive motor to the drive roller.

10. The apparatus according to claim 9 wherein the means for connecting the output of the drive motor to the drive roller comprises:
    a speed reducer driven by a drive motor; and
    chain and sprocket drive means connecting the output of the speed reducer to the drive roller.

11. The apparatus according to claim 6 wherein the means for selectively pivoting the housing comprises fluid powered cylinder means.

12. The apparatus according to claim 6 wherein:
    the means for pivoting the subframe comprises fluid powered cylinder means;
    the means for pivoting the housing comprises fluid powered cylinder means; and
    the drive means comprises a drive motor mounted on the housing and means operatively connecting the output of the drive motor to the drive shaft.

13. Apparatus for propelling and positioning the vehicle of the type having a chassis supported by front and rear wheels which comprises;
    first and second subframes, the first subframe being supported for pivotal movement toward and away from one of the front wheels of the vehicle and the second subframe being supported for pivotal movement toward and away from one of the rear wheels of the vehicle;
    first and second drive rollers supported on the first and second subframes, respectively, for rotation about predetermined axes;
    means for selectively pivoting the first and second subframes relative to the chassis of the vehicle and thereby selectively engaging the first and second drive rollers with said one of the front wheels and said one of the rear wheels of the vehicle, respectively;

first and second housings supported for pivotal movement about the axes of the first and second drive rollers, respectively;

first and second drive means mounted on the first and second housings, respectively, for selective actuation to propel the vehicle when the first and second drive rollers are engaged with said one of the front wheels and said one of the rear wheels of the vehicle;

said first and second drive means further comprising means for selectively locking the first and second drive rollers against rotation about their respective axes; and means for selectively pivoting the first and second housings about the axes of the first and second drive rollers when said drive rollers are engaged with the front and rear wheels of the vehicle, respectively, and are locked against rotation and thereby selectively rotating said front and rear wheels of the vehicle to position the vehicle.

14. The apparatus according to claim 13 wherein the means for pivoting the first and second subframes to engage the first and second drive rollers with said one of the front wheels and said one of the rear wheels of the vehicle, respectively, comprises fluid powered cylinder means adapted to independently engage the first and second drive rollers with said front and rear wheels of the vehicle.

15. The apparatus according to claim 13 wherein the means for selectively pivoting the first and second housings while the first and second drive rollers are locked against rotation comprises fluid powered cylinder means adapted to independently pivot the first and second housings about the axes of the first and second drive rollers, respectively.

16. The apparatus according to claim 13 wherein the first and second drive means each comprises a drive motor mounted on one of the housings and means operatively connecting the output of the drive motor to its respective drive roller.

17. The apparatus according to claim 16 wherein the means operatively connecting the output of the drive motor to the drive roller comprises speed reducer means driven by the drive motor and chain and sprocket drive means operatively connecting the output of the speed reducer means to the drive roller.

* * * * *